(12) United States Patent
Yamamoto et al.

(10) Patent No.: US 7,385,642 B2
(45) Date of Patent: Jun. 10, 2008

(54) CAMERA PORTABLE TELEPHONE INCLUDING LEDS USED FOR BOTH A CAMERA FLASH AND CALL NOTIFICATION OF AN INCOMING CALL

(75) Inventors: Isao Yamamoto, Kyoto (JP); Koichi Miyanaga, Kyoto (JP)

(73) Assignee: Rohm Co., Ltd. (JP)

( * ) Notice: Subject to any disclaimer, the term of this patent is extended or adjusted under 35 U.S.C. 154(b) by 626 days.

(21) Appl. No.: 10/950,006

(22) Filed: Sep. 24, 2004

(65) Prior Publication Data

US 2005/0068457 A1 Mar. 31, 2005

(30) Foreign Application Priority Data

Sep. 25, 2003 (JP) ............................. 2003-334452

(51) Int. Cl.
*H04N 5/222* (2006.01)
(52) U.S. Cl. ..................................... 348/370
(58) Field of Classification Search ................. 348/370
See application file for complete search history.

(56) References Cited

U.S. PATENT DOCUMENTS 7,085,489 B2 * 8/2006 Yamashita .................. 396/157

2003/0107656 A1 * 6/2003 Ito et al. .................. 348/216.1

FOREIGN PATENT DOCUMENTS

| CN | 1461165 A | 12/2003 |
| JP | 2002-116481 | 4/2002 |
| JP | 2002-374339 | 12/2002 |
| JP | 2003-179808 | 6/2003 |
| JP | 2003-333155 | * 11/2003 |

OTHER PUBLICATIONS

Japanese Office Action for Japanese Patent Application No. 2003-334452 dated Apr. 18, 2006, with English translation.
Chinese Office Action for Application No. 2004-10082460.X (with English Translation) mailed Oct. 19, 2007.

* cited by examiner

*Primary Examiner*—James M. Hannett
(74) *Attorney, Agent, or Firm*—Cantor Colburn LLP (57) ABSTRACT

The image shooting apparatus 10 provided not only with the image shooting function but also the communications function is, for example, a camera portable telephone. The apparatus includes a call incoming notifying section, a camera section and an LCD monitor. LEDs in the call incoming notifying section emit a normal light for notifying a user of call incoming when an incoming call is detected and emit a high-luminance electronic flash light when the camera section is operated to take a photograph.

7 Claims, 7 Drawing Sheets

CAMERA PORTABLE TELEPHONE INCLUDING LEDS USED FOR BOTH A CAMERA FLASH AND CALL NOTIFICATION OF AN INCOMING CALL

BACKGROUND OF THE INVENTION

1. Field of the Invention

The present invention generally relates to image shooting apparatuses provided with light emitting elements and, more particularly, to an image shooting apparatus provided with a control circuit for controlling the light emission of light emitting elements.

2. Description of the Related Art

A digital camera picks up images of a subject by a photo detector such as a charge-coupled device (CCD). The CCD is provided with photo diodes and converts outdoor daylight into electric charges by the photoelectric effect. Image information is registered by charges generated according to the intensity of light. In other words, imaging is performed. Each CCD element is provided with a color filter corresponding to, for example, a primary color such as red, green and blue (RGB). The color filter has the property of transmitting only the color it corresponds to. A digital camera acquires color information of a subject as well as the intensity of light by combining CCDs and color filters. Conventionally, it was common to use a xenon tube as a light source for an electronic flash apparatus of a camera. It has been suggested to use a light emitting diode as a source of light instead of a xenon tube (see, for example, Japanese Laid-Open Patent Application No. 2002-116481).

In recent years, as the pixel resolution of a CCD is improved, many of battery-driven portable appliances such as portable telephones and personal data assistants (PDA) now have built-in digital camera function. The camera function of portable telephones is a feature that sets them apart from other portable telephones provided only with the communications function. Recently, some of these portable appliances, small as they are, have a megapixel resolution and are growing in popularity as a handy tool to take photographs.

When the camera function is to be pursued, it is desirable for a portable telephone to be provided with an electronic flash function so that it can use flash when taking a photograph in dark places. While it is possible to provide an electronic flash function in a portable telephone in addition to the existing functions, such an approach is unfavorable in view of requirements for downsizing and light weight.

SUMMARY OF THE INVENTION

The present invention is done in consideration of the problem discussed above and an object thereof is to provide a technique for building an electronic flash function into an image shooting apparatus such as a camera portable telephone.

An image shooting apparatus according to the present invention includes a plurality of light-emitting elements, an image shooting unit, a communication unit, and a control circuit controlling the apparatus. The control circuit causes the plurality of light-emitting elements to emit light for notification of call incoming, when the communication unit detects call incoming and to emit electronic flash light of high luminance when the image shooting unit takes a photograph. By allowing individual light emitting elements to provide illumination both for call incoming notification and for electronic flash light, space occupied by the apparatus is reduced as compared to a case where different needs are served by different light-emitting elements. The plurality of light-emitting elements preferably include red, green and blue light-emitting diodes producing a white light.

According to the image shooting apparatus of the present invention, it is possible to provide a technology that allows light emitting elements to be used efficiently.

DETAILED DESCRIPTION OF THE INVENTION

Figure 1:
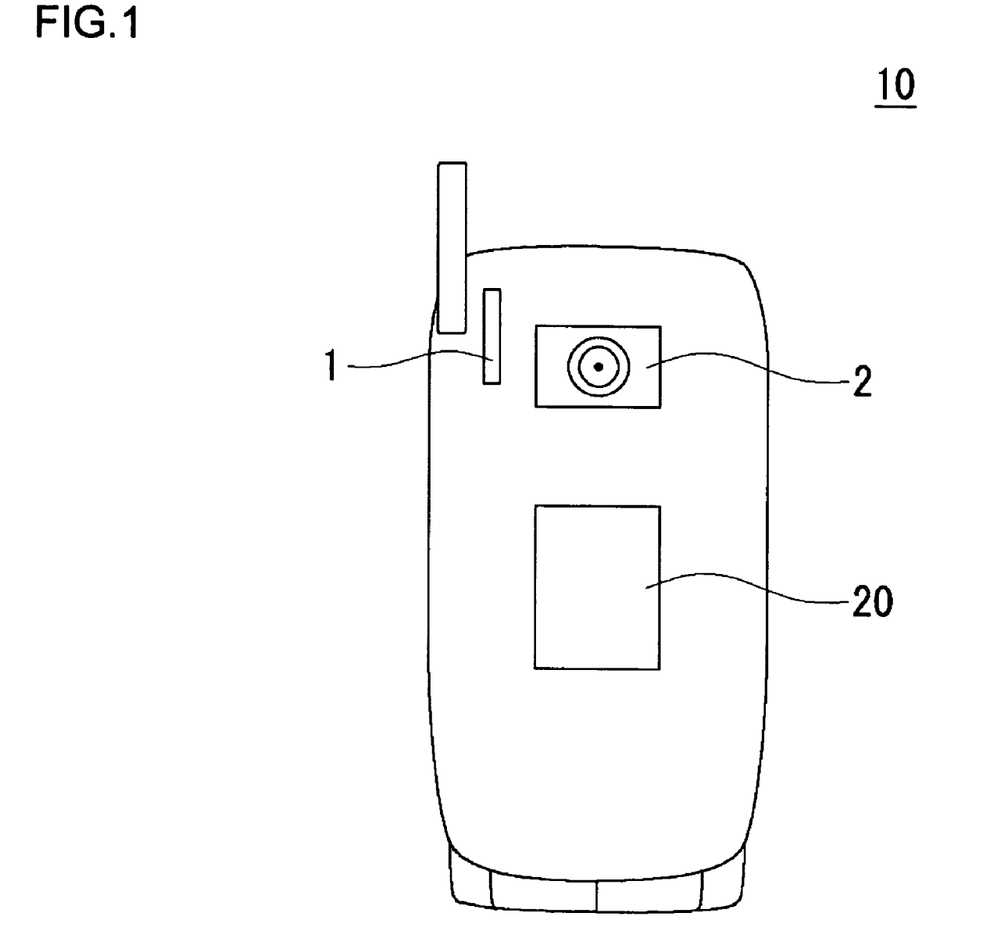
FIG. 1 shows the appearance of an image shooting apparatus having the communication function according to an embodiment of the present invention.

FIG. 1 shows the appearance of an image shooting apparatus 10 having the communications function according to an embodiment of the present invention. The image shooting apparatus 10 has the communications function and the image shooting function. For example, the image shooting apparatus 10 may be a camera portable telephone provided with a call incoming notifying section 1, a camera section 2 and an LCD monitor 20. The image shooting apparatus 10 shown here is a folding camera portable telephone. However, the telephone may not be a folding telephone.

The call incoming notifying section 1 is provided with light emitting elements such as light emitting diodes (hereinafter, referred to as LEDs). The call incoming notifying section 1 is provided with red (R), green (G) and blue (B) LEDs. When an incoming call is detected, the call incoming notifying section 1 causes the LEDs to blink or just simply emit light in a predetermined mode so as to notify a user of call incoming. For example, the LEDs may emit light in synchronization with call incoming sound output from a speaker. By causing the LEDs of three colors to emit light independently, various colors may be produced. This is a normal function of the call incoming notifying section 1. Light emission as described may be referred to as normal light emission.

The LEDs of the call incoming notifying section 1 may emit light of high luminance to provide an electronic flash light when the camera section 2 takes a photograph. It is desirable that a large number of LEDs are provided in an array in order to secure enough light quantity as an electronic flash light. The number of LEDs may differ from color to color. It is desirable that the number of LEDs for respective colors be determined to ensure that a white light is produced when all the LDS are fully taken advantage of, i.e. when all the LEDs emit light.

By configuring the call incoming notifying section 1 to emit light of high luminance to provide an electronic flash light as well as emit a normal light, it is not necessary to provide an additional configuration for electronic flash light in the image shooting apparatus 10. In this way, space occupied by the apparatus is reduced.

The electronic flash function may be provided in the LCD monitor 20 instead of the call incoming section 1. If the LCD monitor 20 is provided with LEDs as a source of backlight, the LEDs may be used to embody both the call incoming function and the electronic flash function.

Figure 2:
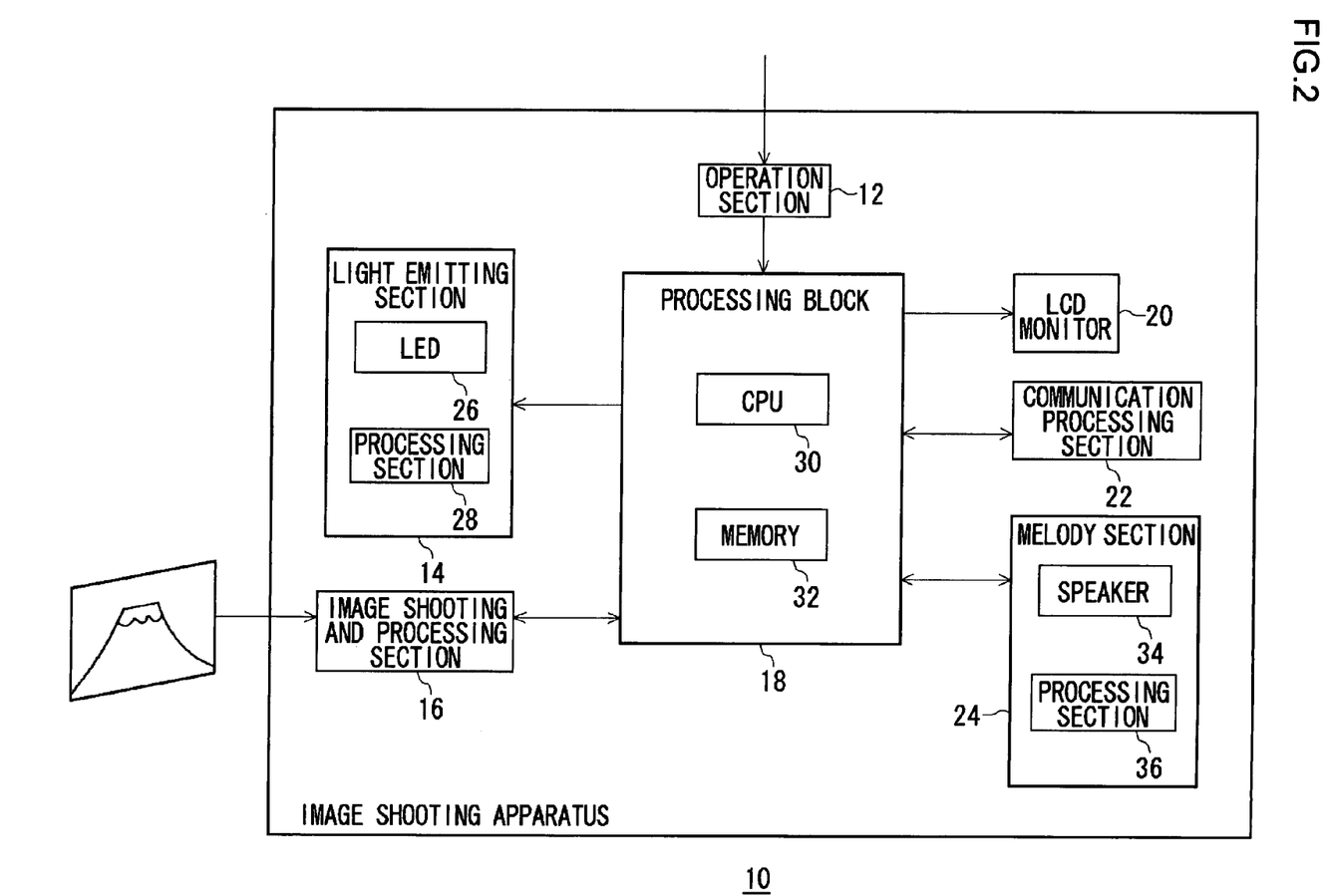
FIG. 2 is a functional block diagram of the image shooting apparatus.

FIG. 2 is a functional block diagram of the image shooting apparatus 10 according to the embodiment. The image shooting apparatus 10 includes an operation section 12, a light emitting section 14, an image shooting and processing section 16, a processing block 18, the LCD monitor 20, a communication processing section 22 and a melody section 24. Further, the light emitting section 14 includes an LED 26 and a processing section 28. The processing block 18 includes a CPU 30 and a memory 32. The melody section 24 includes a loud speaker 34 and a processing section 36. The light emitting section 14 includes LEDs and is incorporated in the call incoming notifying section 1 of FIG. 1. The light emitting section 14 may be built into the LCD monitor 20 as a backlight source. The image shooting and processing section 16 is constructed as an image shooting unit and corresponds to the camera section 2 of FIG. 1.

The communication processing section 22 is a communication unit executing processes necessary for communication. More specifically, the communication processing section 22 detects an incoming call from and originates a call to an external telephone or a server. The term "call incoming" refers not only to incoming of a voice call but also to incoming of packets from a server via a network. A similar definition applies to call origination. The portable telephone system considered here is a personal digital cellular (PDC) system. However, mobile communication systems such as a simplified portable telephone system and a code division multiple access (CDMA) system are not excluded.

The image shooting and processing section 16 picks up and processes images in response to an instruction from the processing block 18. The image shooting and processing section 16 includes a lens (not shown), a diaphragm, an optical lowpass filter (LPF), a CCD, a signal processing section, etc. Electric charges are accumulated in the CCD in accordance with the light quantity of a subject image formed on a light-receiving surface of the CCD. The accumulated charges are read out as a voltage signal. The voltage signal is dissolved into R, G and B components by the signal processing section, whereupon white balance adjustment and gamma correction are performed. Subsequently, the R, G and B signals are subject to analog-to-digital conversion. Resultant digital image data are then output to the processing block 18.

In relation to the communication function, the operation section 12 includes buttons for allowing the user to input telephone numbers and the like. In relation to the image shooting function, the operation section 12 includes a power switch, a release switch and the like that allow the user to shooting images and set various operation modes. In relation to the communication function, the LCD monitor 20 displays a telephone number of the party at the other end of the line, etc. In relation to the image shooting function, the LCD monitor 20 displays image shooting/play modes, a zoom scale and the like in addition to displaying the image of a subject.

The melody section 24 plays a predetermined call incoming sound in order to notify the user of call incoming when the call processing section 22 detects an incoming call. The processing section 36 of the melody 24 executes a program so as to play the call incoming sound from pre-recorded data. The speaker 34 outputs the call incoming sound played by the processing section 36. The melody section 24 may play a predetermined melody instead of the call incoming sound.

When the communication processing section 22 detects an incoming call, the light emitting section 14 causes the LED 26 to blink for illumination, in synchronization with the call incoming sound. The processing section 28 executes a process for causing the LED 26 to blink. When the image shooting apparatus 10 is used as an image shooting apparatus, the processing unit 28 causes the LED 26 to emit an electronic flash light. When the LED 26 is used to provide an electronic flash light, the CPU 30 provides an instruction for emitting electronic flash light to the processing section 28, in response to an input from the user to the operation section 12.

The processing block 18, including the central processing unit (CPU) 30 implementing a control circuit and the memory 32, effects overall control of the whole process in the image shooting apparatus 10. An external memory may be used as the memory 32.

Figure 3:
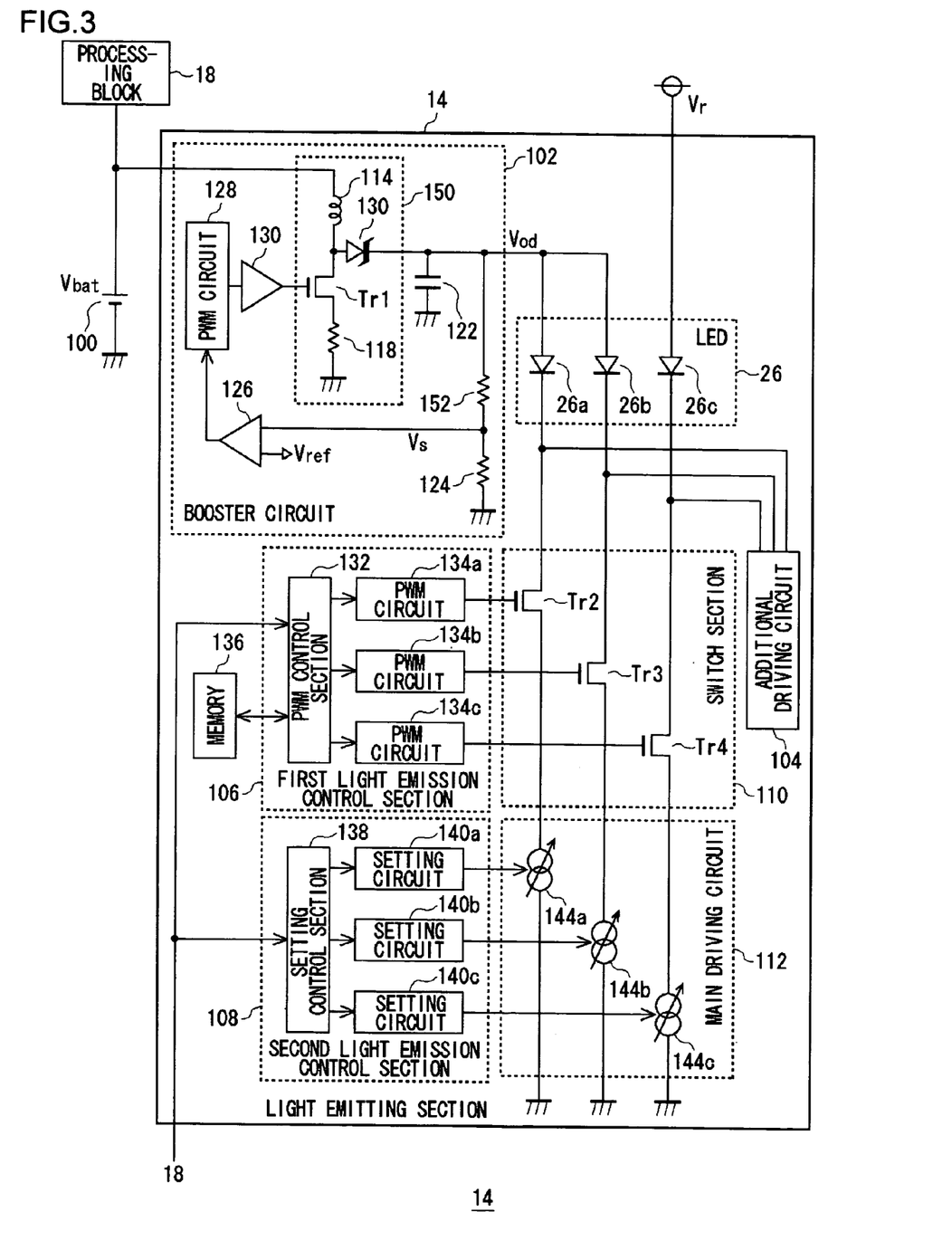
FIG. 3 shows a construction of a light emitting section of FIG. 2.

FIG. 3 shows a construction of the light emitting section 14. The light emitting section 14 is connected to a lithium ion battery 100 and the processing block 18. The light emitting section includes: a booster circuit 102; a first LED 26a, a second LED 26b and a third LED 26c generically referred to as the LED 26; an additional driving circuit 104, a first light emission control section 106, a second light emission control section 108, a switch section 110, a main driving circuit 112 and a memory 136. Further, the booster circuit 102 includes a boost chopper circuit 150, a capacitor 122, a first resistor 152, a second resistor 124, an error amplifier 126, a PWM circuit 128 and a driver 130. The boost chopper circuit 150 includes an inductance 114, a resistor 118, a driver 130 and a transistor Tr1. The first light emission control section 106 includes: a PWM control section 132; and a first PWM circuit 134a, a second PWM circuit 134b and a third PWM circuit 134c generically referred to as a PWM circuit 134. The second light emission control section 108 includes: a setting control section 138; and a first setting circuit 140a, a second setting circuit 140b and a third setting circuit 140c generically referred to as a setting circuit 140. The switch section 110 includes a transistor Tr1, a transistor Tr2 and a transistor Tr3. The main driving circuit 112 includes a first variable current circuit 144a, a second variable current circuit 144b and third variable current circuit 144c generically referred to as a variable current circuit 144. Those parts of the light emitting section 14 other than the LED 26 correspond to the processing section 28 of FIG. 2.

The booster circuit 102 boosts an input voltage according to a switching strategy, the input voltage being a battery voltage Vbat of the lithium ion battery 100, and outputs a boosted voltage Vod. It is assumed that the battery voltage Vbat is 3V. The boost chopper circuit 150 charges energy in and discharges energy from the inductance 114 by an on and off operation of the transistor Tr1, thus boosting the battery voltage Vbat to a boosted voltage Vod. A drain current flows through the resistor 118 via the inductance 114 while the transistor Tr1 is turned on in the boost chopper circuit 150, allowing the battery voltage Vbat to store magnetic energy in the inductance 114. When the transistor Tr1 is turned off subsequently, the magnetic energy stored in the inductance 114 while the transistor Tr1 is turned on is discharged as electric energy and turns into a current that flows through the driver 130. The voltage generated in the inductance 114 is positively superimposed on the battery voltage Vbat and stabilized by the main driving circuit 112 before being output as the boosted voltage Vod.

The boost ratio of the boosted voltage Vod output by the boost chopper circuit 150 is determined by a duration ratio between an on period and an off period of the transistor Tr1 operated as a switch. The PWM circuit 128 produces the on and off duration ratio of the switch. Assuming that the on and off switching period of the switch is T and the on duration of the switch is Ton, the PWM circuit 128 generates a pulse signal with a duty ratio of Ton/T. The driver 130 turns the transistor Tr1 on and off in response to the pulse signal generated by the PWM circuit 128. When the pulse signal is at a high (H) level, the transistor Tr1 is turned on. When the pulse signal is at a low (L) level, the transistor Tr1 is turned off.

The pulse width of the pulse signal generated by the PWM circuit 128 varies in accordance with an output from the error amplifier 126. The error amplifier 126 compares a detected voltage Vs derived from dividing the boosted voltage Vod by the two voltage dividing resistors including the first resistor 152 and the second resistor 124 with a reference voltage Vref from a reference voltage source, and amplifies an error between the reference voltage Vref and the detected voltage Vs so as to feed a resultant voltage back to the PWM circuit 128. The PWM circuit 128 modulates the pulse width of the pulse signal according to the output of the error amplifier 126 by controlling an on duration Ton of the switch, and matches the detected voltage Vs with the reference voltage Vref by feedback control.

The first LED 26a emits a green light, the second LED 26b emits a blue light and the third LED 26c emits a red light. Since the first LED 26a and the second LED 26b are generally operated with a drive voltage of about 4.5V, the above-mentioned boosted voltage Vod is set to 4.5V. Since the third LED 26c is generally operated with a drive voltage of about 2.5V, Vr is set to 2.5V. When the LED 26 is used for illumination, the main driving circuit 112 described later feeds a current of a maximum of about 25 mA to drive the LED 26.

The transistors Tr2 through Tr4 are provided between the LED 26 and the main driving circuit 112 described later so as to establish or shut connection between the LED 26 and the main driving circuit 112. If the voltage applied to a gate of the transistor Tr2 is at a high (H) level so that the transistor Tr2 is turned on, the first LED 26a and the first variable current circuit 144a described later are connected to each other. The transistor Tr3 and the transistor Tr4 are operated similarly. LEDs in the LED 26 are lighted while the corresponding ones of the transistors Tr2 through Tr4 are being turned on. The transistors Tr2 through Tr4 are turned on independently by the first later light emission control section 106 described later.

The variable current circuit 144 feeds a current to drive the LED 26. The magnitude of the current fed by the variable current circuit 144 is controlled by the second light emission control section 108 described later to have a plurality of discrete levels. the maximum being about 25 mA as described before. The current at the plurality of discrete levels changes the luminance of the LED 26. The first variable current circuit 144a through the third variable current circuit 144c may feed the current of mutually different magnitudes. It is assumed here that they feed the current of the same magnitude.

The PWM control section 132 effects control such that the LED 26 is lighted for illumination in predetermined tones of color, in accordance with illumination data for the LED 26 stored in the memory 136 and an instruction from the processing block 18. The instruction from the processing block 18 may include an instruction indicating call incoming. The illumination data for the LED 26 stored in the memory 136 may include data that causes two or more LEDs in the LED 26 to be lighted simultaneously at call incoming so that a mixture of green, blue and red light is produced. The data may also include data for turning the transistors Tr2 through Tr4 to be on and off according a predetermined rule so that the LEDs in the LED 26 are lighted in a designated order.

In addition to the data for merely turning the transistors Tr2 through Tr4 on and off, the illumination data for the LED 26 may also include data for controlling individual transistors by turning the transistors Tr2 through Tr4 on and off for mutually different periods of time so that the LEDs in the LED 26 produce mutually different quantity of light to produce a predetermined tone of color. The illumination data may include data for causing the LEDs in the LED 26 to produce the same quantity of light when the LED 26 is used as an electronic flash light.

The PWM circuit 134 performs PWM modulation in accordance with an instruction from the PWM control section 132. When the first PWM circuit 134a is directed by the PWM control section 132 to increase the quantity of light produced by the first LED 26a, the first PWM circuit 134a generates a pulse signal for extending the duration of the high level and outputs the signal to the transistor Tr2. The second PWM circuit 134b and the third PWM circuit 134c are operated similarly.

The setting control section 138 controls the magnitude of the driving current fed by the variable current circuit 144 according to an instruction from the second light emission control section 108. In order to increase the luminance of the LED 26, the operation of the setting circuit 140 is controlled so as to increase the driving current fed by the variable current circuit 144. As mentioned earlier, the driving current fed by the first variable current circuit 144a through the third variable current circuit 144c are assumed to be identical in magnitude. Accordingly, the setting control section 138 controls the first setting circuit 140a through the third setting circuit 140c in the same manner.

The additional driving circuit 104 feeds a driving current to the LED 26 so that the LED 26 is operated to produce an electronic flash light when the image shooting apparatus 10 is operated as an image shooting apparatus. When the LED 26 is operated to provide illumination, the driving current of a maximum of 25 mA is fed. When the LED 26 is operated to provide an electronic flash light, the driving current is set to have a maximum of 150 mA. By feeding the driving current so that the quantity of light produced by the plurality of LEDs is identical, it is ensured that the tone of color produced by the plurality of LEDs in the LED 26 is white. The number of LEDs in the LED 26 and the arrangement thereof may be adjusted so that a white light is produced when the entirety of the LED 26 is lighted. The details of the additional driving circuit 104 will be given later.

Figure 4A:
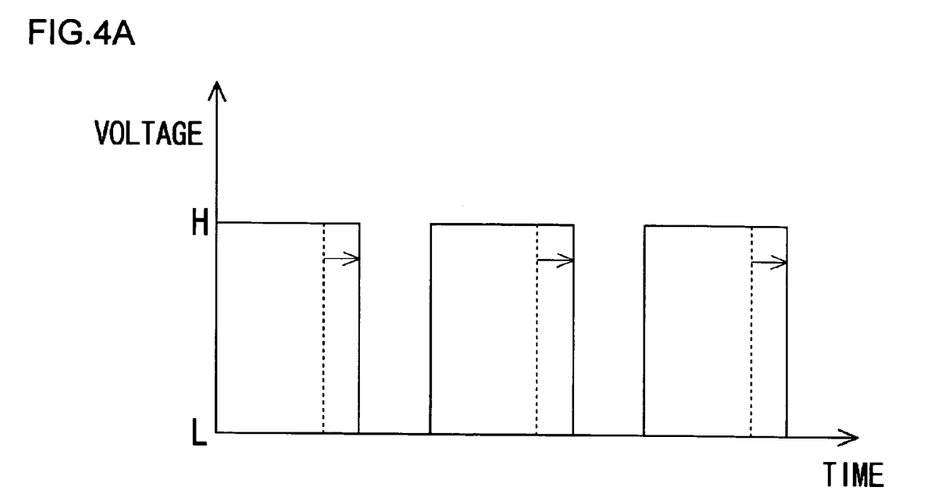
FIG. 4A shows an operation of a first light emission control section of FIG. 3.

FIG. 4A shows an operation of the first light emission control section 106 and shows, in particular, a pulse-width modulated pulse signal generated by the first light emission control section 106. As illustrated, the first light emission control section 106 generates a pulse signal in which a high (H) level and a low (L) level alternate. The transistors Tr2 through Tr4 are turned on when the H level voltage is applied thereto, resulting in associated LEDs in the LED 26 being lighted. To increase the quantity of light produced by the LED 26, the first light emission control section 106 extends the duration of the H level so that the shape of the pulse is changed from the dotted line to the solid line. In other words, the duty ratio is increased. By adjusting the duty ratio for the plurality of LEDs in the LED 26, the tone of color is changed.

Figure 4B:
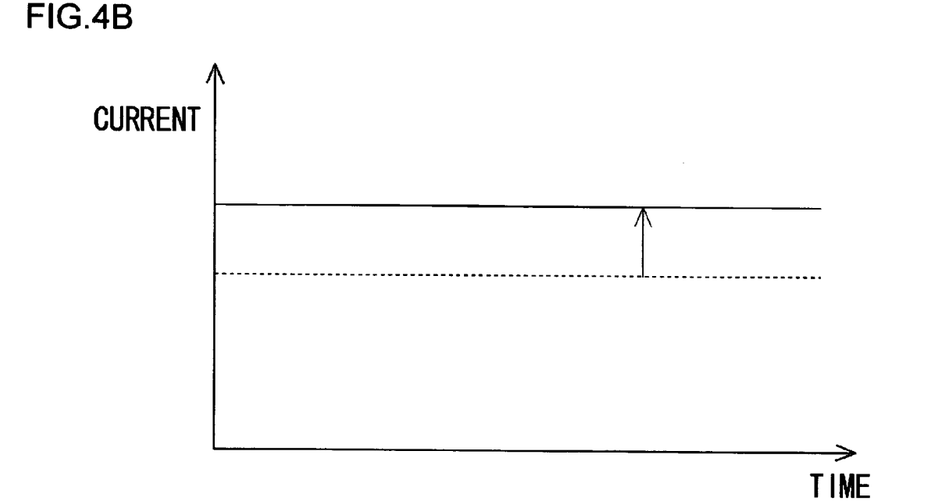
FIG. 4B shows an operation of a second light emission control circuit.

FIG. 4B shows an operation of the second light emission control section 108 and shows, in particular, the magnitude of the driving current fed by the variable current circuit 144. By controlling the magnitude of the driving current to change from the level of the dotted line to the level of the solid line, the luminance of the LED 26 is increased.

Figure 5:
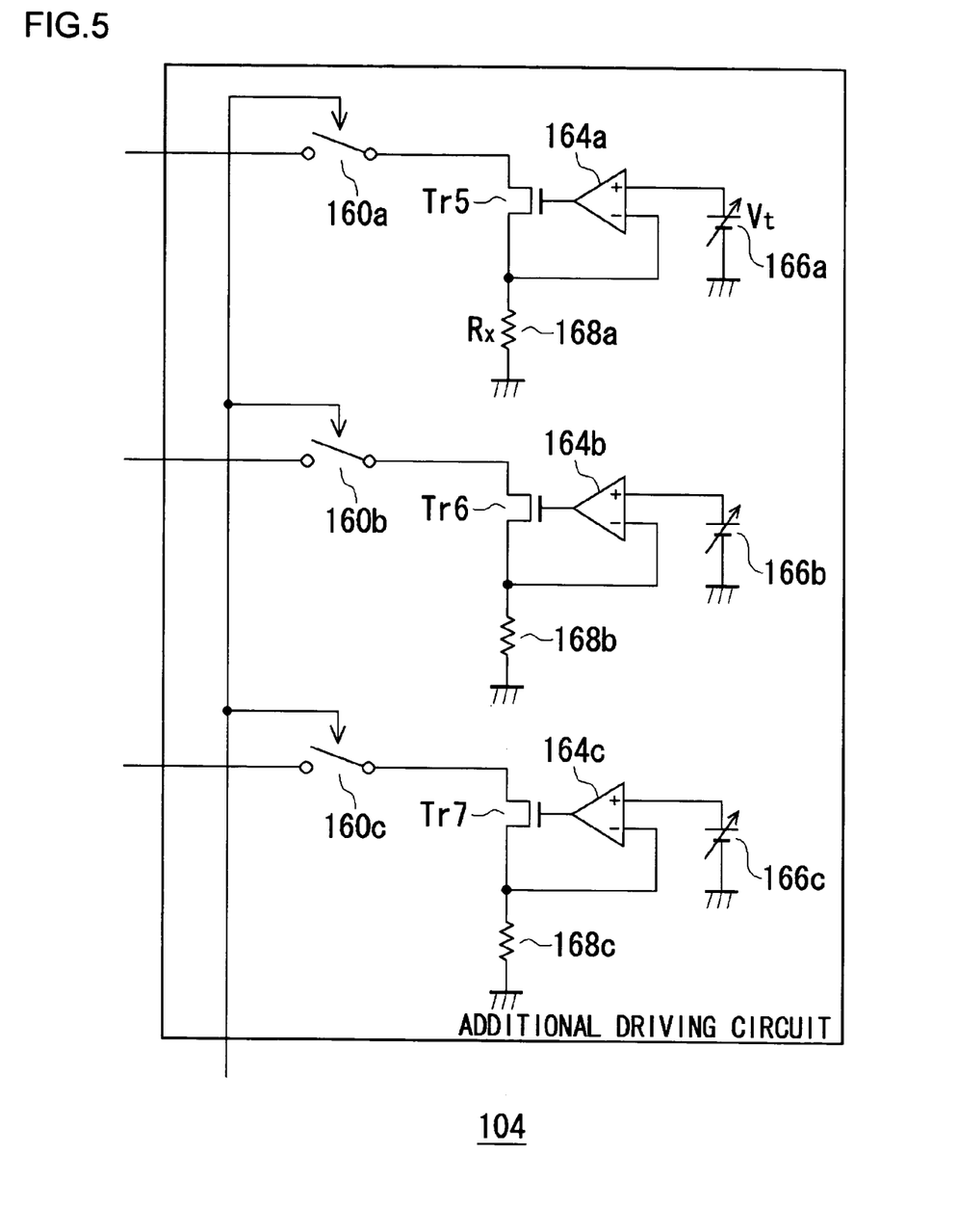
FIG. 5 shows a construction of an additional driving circuit of FIG. 3.

FIG. 5 shows a construction of the additional driving circuit 104. The additional driving circuit 104 includes: a first switch for electronic flash light 160a, a second switch for electronic flash light 160b and a third switch for electronic flash light 160c generically referred to as a switch for electronic flash light 160; a first error amplifier 164a, a second error amplifier 164b and a third error amplifier 164c generically referred to as an error amplifier 164; a first variable power source 166a, a second variable power source 166b and a third variable power source 166c generically referred to as a variable power source 166; a first resistor 168a, a second resistor 168b and a third resistor 168c generically referred to as a resistor 168; and transistors Tr5 through Tr7.

The first switch for electronic flash light 160a is connected to the first LED 26a, the second switch 160b to the LED 26b, and the third switch 160c to the LED 26c. The switches are turned on in response to an instruction from the processing block 18 (not shown). Since the switches are operated in the same manner, only the system connected to the switch 160a for electronic flash light will be described.

The non-inverting input terminal of the first differential amplifier 164a is connected to the variable power supply 166a, the inverting input terminal to the source terminal of the transistor Tr5, and the output terminal to the gate terminal of the transistor Tr5. A voltage commensurate with a voltage across the inverting input terminal and the non-inverting input terminal is output from the output terminal. If the inverting input terminal and the non-inverting input terminal are virtually shorted, the voltage at the inverting input terminal is approximately equal to a voltage Vx at the non-inverting input terminal. Further, a current defined by Vx/Rx flows through the first resistor 168a of an ohmic value Rx and drives the LED 26. The variable power source 166 and the resistor 168 are configured so that a current of a maximum of 150 mA is fed in order to use the LED 26 to provide electronic flash light.

The operation of the light emitting section 14 constructed as described above will now be described. When the operation for illumination at call incoming is designated by the processing block 18, the voltage Vbat output from the lithium ion battery 100 is boosted to Vod by the booster circuit 102 and applied to the first LED 26a and the second LED 26b. The voltage Vr lower than the voltage Vbat is applied to the third LED 26c. The PWM control section 132 determines the quantity of light to be produced by each of the plurality of LEDs in the LED 26 so that a light with a desired tone of color is emitted, in accordance with an instruction from the processing block 18. The PWM control section 132 then feeds the corresponding duty ratio of pulse signal to the PWM circuit 134. The PWM circuit 134 generates pulse width modulated signals so as to turn the transistors Trs through Tr4 on for a duration defined by the H level period of the pulse signal. The second light emission control section 108 determines the quantity of light produced by each of the LEDs in the LED 26 so that a light with a desired luminance level is emitted, in accordance with an instruction from the processing block. According to the quantity of light thus determined, the second light emission control section 108 adjusts the magnitude of current fed by the variable current circuit 144 so as to drive the LED 26 with the current.

When the operation for electronic flash light is designated by the processing block 18, the PWM control section 132 designates the duty ratios of pulse signals to the PWM circuit 134 so that a white light is emitted by the LED 26. By turning on the switch for electronic flash light 160 and causing a larger current to flow in the LED 26, light emission higher in luminance than illumination is obtained.

Figure 6:
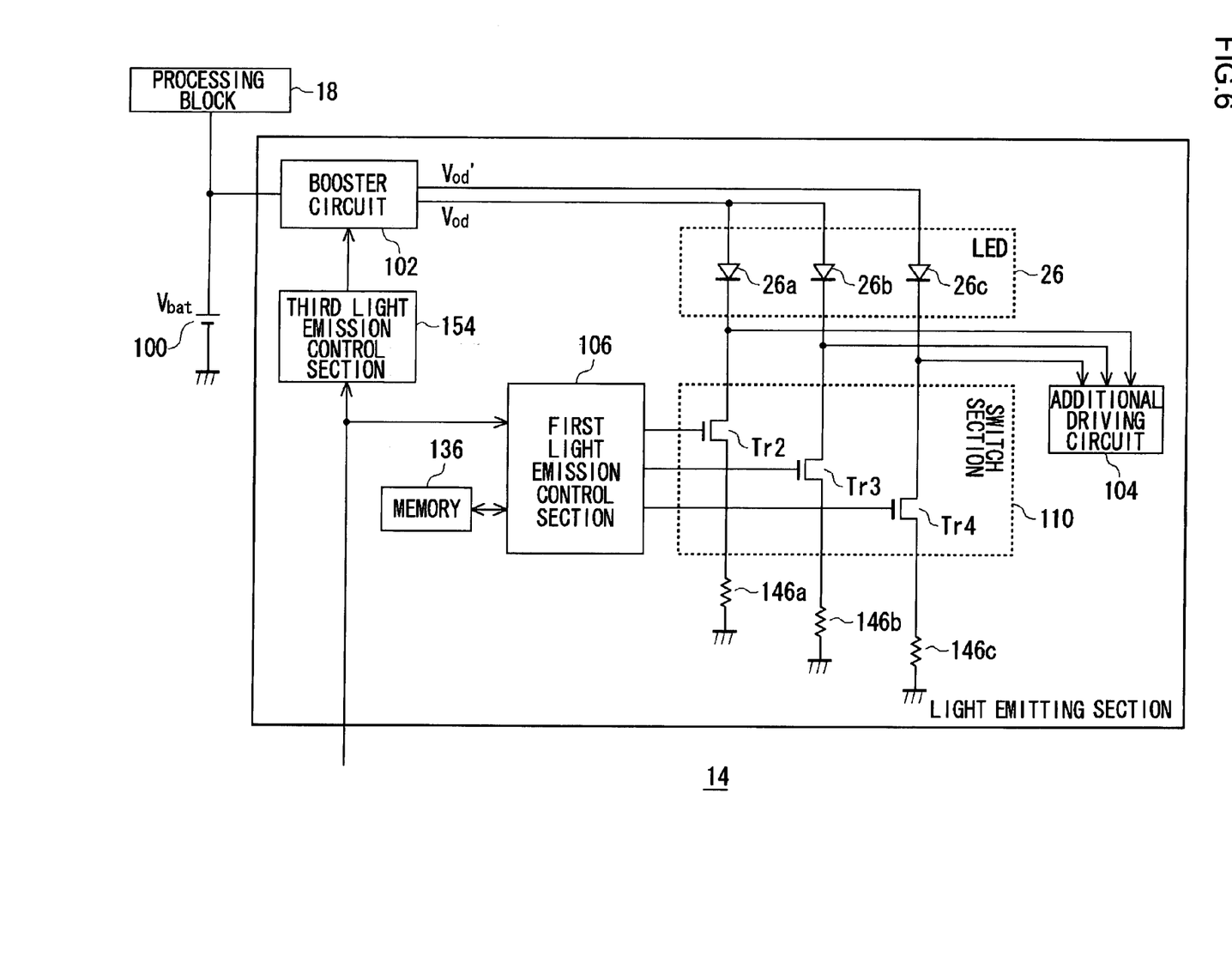
FIG. 6 shows a construction of a second light emitting section of FIG. 2.

FIG. 6 shows a construction of the light emitting section 14 of a type different from that of FIG. 3. Unlike the light emitting section 14 of FIG. 3, the light emitting section of FIG. 6 includes a third light emission control section 154. The main driving circuit 112 includes a first resistor 146a, a second resistor 146b and a third resistor 146c generically referred to as a resistor 146.

The third light emission control section 154 directs the booster circuit 102 to generate a voltage for driving the LED 26 in accordance with an instruction from the processing block 18. As described above, the first light emission control section 106 controls the tone of color of light emitted by the plurality of LEDs in the LED 26. The third light emission control section 154 controls the luminance of light emitted by the plurality of LEDs in the LED 26. It is assumed that the luminance of light emitted by the plurality of LEDs in the LED 26 is identical to each other.

As described above, the booster circuit 102 generates the boosted voltage Vod from the battery voltage Vbat. Further, a Schottky barrier diode 120 is connected in parallel with the booster circuit 102 so that a boosted voltage Vod' of a level different from the level of the boosted voltage Vod is generated so as to drive the third LED 26c having a threshold voltage different from the other LEDs in the LED 26. A plurality of voltages Vref are provided in order to generate different boosted voltages. The resistor 146 converts the voltage into a current that drives the LED 26.

Figure 7:
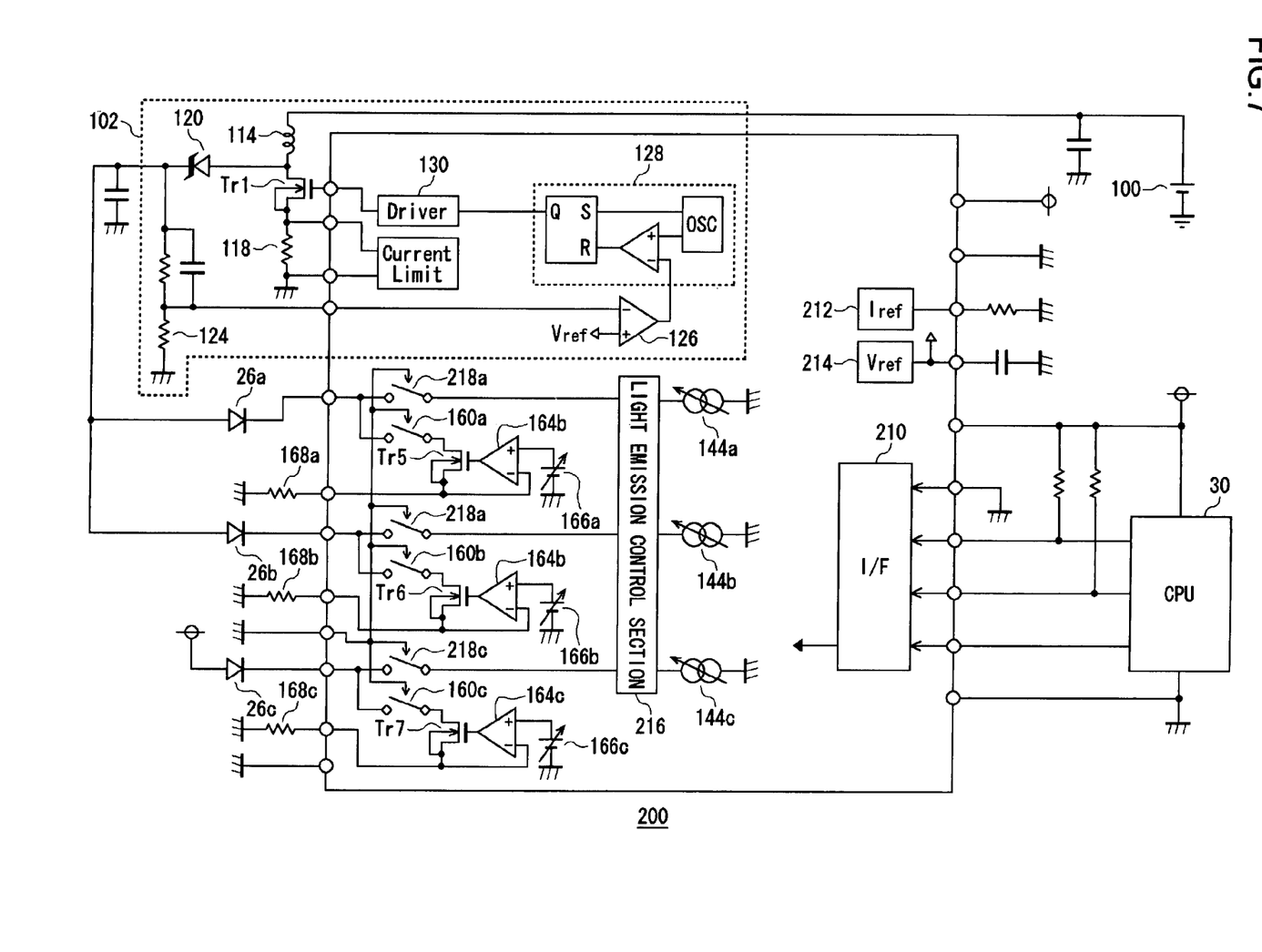
FIG. 7 shows a construction of a light emission control IC according to the embodiment.

FIG. 7 shows a construction including a light emission control IC 200 that actually implements the embodiment of the invention. Referring to FIG. 7, those components that are identical to the corresponding components already described are denoted with the same consistent reference symbols and the description thereof is omitted. The light emission control IC 200 includes: an interface circuit 210; an Iref circuit 212; a Vref circuit 214; a light emission control section 216; an first switch for illumination 218a, a second switch for illumination 218b and a third switch for illumination 218c generically referred to as a switch for illumination 218.

The light emission control IC 200 is different from the light emitting section 14 of FIG. 3 in that the inductance 114, the resistor 118 and the Schottky barrier diode 120 and the transistor Tr1 of the booster circuit 102 are not included in the IC. The LED 26 and the resistor 168 are not included either.

The interface circuit 210 receives a signal from the CPU 30 and outputs a signal to the CPU 30. The Iref circuit 212 and the Vref circuit 214 generate a reference current and a reference voltage, respectively. The voltage Vref generated by the Vref circuit 214 is input to the error amplifier 126. The light emission control section 216 as shown includes the first light emission control section 106 and the second light emission control section 108 of FIG. 3. The light emission control section 216 controls the variable current circuit 144 using a control signal line (not shown). The switch for illumination 218 is turned on when the LED 26 is used for illumination and turned off when the LED 26 is used to provide an electronic flash light. In the light emitting section 14 of FIGS. 3 and 6, when the LED 26 is used to provide an electronic flash light, the current generated by the variable power source 166 and the resistor 168, and the current generated by the variable current circuit 144 flow through the LED 26. In the IC, only the former current flows.

According to the embodiment of the present invention, it is possible to control the tone of color of light emitted by the LED elements by adjusting the duty ratios of pulse signals. By controlling the magnitude of current for driving the LED elements, the luminance of light emitted by the LED elements is controlled. Since the tone of color and luminance of light emitted by the individual LED elements are independently adjustable, the tone of color and luminance of light emitted by the LED elements as a whole are easily adjusted. The luminance can easily be changed while the tone of color of light already emitted by the LED elements is maintained. Alternatively, the tone of color can easily be changed while the luminance is maintained.

Described above is an explanation based on the embodiment. The embodiment of the present invention is only illustrative in nature and it will be obvious to those skilled in the art that various variations in constituting elements and processes are possible within the scope of the present invention.

What is claimed is:

1. An image shooting apparatus comprising:
 a plurality of light-emitting elements;
 an image shooting unit;
 a communication unit;
 a main driving circuit which feeds a current to each of the plurality of light-emitting elements;
 a plurality of switches respectively provided between the plurality of light-emitting elements and the main driving circuit so as to respectively establish or shut off connection between the plurality of light-emitting elements and the main driving circuit;
 an additional driving circuit provided separately from the main driving circuit so as to feed a current to each of the plurality of light-emitting elements; and
 a control circuit controlling the plurality of light-emitting elements, the image shooting unit, the communication unit, the main driving circuit, the plurality of switches, the additional driving circuit and the apparatus as a whole, wherein the additional driving circuit includes a plurality of switches for electronic flash light respectively connected to the plurality of light-emitting elements;

the control circuit makes the main driving unit cause the plurality of light-emitting elements to emit light for notification of call incoming by turning on and off the plurality of switches by pulse width modulation, when said communication unit detects call incoming, and makes the additional driving circuit cause the plurality of light-emitting elements to emit an electronic flash light of high luminance by turning on the plurality of switches for electronic flash light, when said image shooting unit takes a photograph.

2. The image shooting apparatus according to claim 1, wherein said plurality of light-emitting elements include red, green and blue light-emitting diodes.

3. The image shooting apparatus according to claim 2, wherein said plurality of light-emitting elements are provided in an array.

4. The image shooting apparatus according to claim 3, wherein the number of said plurality of light-emitting elements for respective colors is determined to ensure that a white light is produced when all said plurality of light-emitting elements emit light.

5. The image shooting apparatus according to claim 1, wherein the control circuit makes the main driving circuit feed a current of a maximum of 25 mA to the plurality of light-emitting elements by turning on and off the plurality of switches by pulse width modulation, when the communication unit detects call incoming.

6. The image shooting apparatus according to claim 1, wherein the control circuit makes the additional driving circuit feed a current of a maximum of 150 mA to the plurality of light-emitting elements by turning on the plurality of switches for electronic flash light, when the image shooting unit takes a photograph.

7. The image shooting apparatus according to claim 1, wherein the additional driving circuit further includes transistors respectively connected to the plurality of switches for electronic flash light, error amplifiers respectively connected to the gate terminals of the transistors, and variable power sources respectively connected to first input terminals of the error amplifiers, wherein source terminals of the transistors are respectively connected to second input terminals of the error amplifiers, and the variable power sources configure a drive current for electronic flash light.

* * * * *